Patented Apr. 21, 1925.

1,534,828

UNITED STATES PATENT OFFICE.

JAMES A. BARR, OF MOUNT PLEASANT, TENNESSEE, ASSIGNOR TO THE INTERNATIONAL AGRICULTURAL CORPORATION, OF NEW YORK, N. Y., A CORPORATION OF NEW YORK.

BRIQUETTE OF PHOSPHATE-ROCK MATERIAL AND METHOD OF MAKING THE SAME.

No Drawing.   Application filed March 18, 1924. Serial No. 700,189.

*To all whom it may concern:*

Be it known that I, JAMES A. BARR, a citizen of the United States, and resident of Mount Pleasant, in the county of Maury and State of Tennessee, have invented certain new and useful Improvements in Briquettes of Phosphate-Rock Material and Methods of Making the Same, of which the following is a specification.

My invention relates to briquettes made of phosphate rock material which are particularly adapted for use in blast furnace charges in the manufacture of iron. The use of phosphate rock has been proposed for increasing the phosphorus content of iron (for the purpose of increasing its fluidity,) by adding the phosphate material to the charge in the blast furnace. Due to the fact that phosphate rock material of today largely exists as fines, a considerable loss will result by the material being carried out the stack unless it is properly briquetted. Attempts have been made to briquette the phosphate material by the use of the ordinary binding materials, such as pitch, etc., but these have introduced so much foreign material into the briquette as to be uneconomical.

I have now discovered that I may employ phosphoric acid as a binding material for the briquettes, taking advantage of the fact that the acid phosphates formed themselves constitute an excellent binding material, while at the same time the increase in the $P_2O_5$ content due to the addition of this acid, renders the briquette of unusual value for the purpose specified.

The following is an illustrative example of my improved method:

One hundred parts by weight, of phosphate sand running in size from $\frac{3}{16}$ inch grains down to the finest grains ordinarily obtained from commercial recovery systems are mixed with eight parts, by weight, of water. The moist mixture of phosphate sand is then thoroughly mixed with five parts, by weight, of crude phosphoric acid (50 per cent $H_3PO_4$). The mixing with the phosphoric acid should take from one to three minutes and should be at a temperature of 100° F. If the mixing is continued too long the material will dry out and start to set. The mix is then passed through briquetting machinery of standard type, such as the so-called "Belgian roll" machinery, and subjected to a pressure of about 8000 pounds to the square inch. For the purpose of drying briquettes formed they are discharged onto a slow moving conveyor and maintained in an atmosphere heated to about 212° F., or thereabouts. The briquettes are kept in this atmosphere until the hardening is completed, which usually takes place in a couple of hours. Conveniently, the briquettes may be discharged onto a slow moving conveyor and passed through a drying chamber at such a rate that hardening will be completed when the chamber has been traversed.

The chemical reaction is limited to the surface of the grains since only enough phosphoric acid is added to partially convert the tricalcium phosphate to mono- or dicalcium phosphate. The presence of the acid salts or salt thus formed in situ causes an hardening or set to take place and, aided by the pressure employed in the briquetting causes the material to assume a structure of the requisite hardness and coherence. The following is believed to represent the chemical reaction involved:

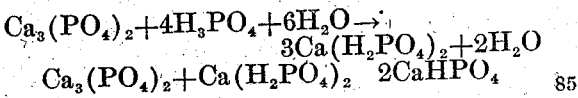

While phosphoric acid of any origin may be used, I prefer to use the crude acid as produced by the commercial phosphate rock-sulphuric acid process, as the acid thus produced usually contains impurities such as monocalcium phosphate, aluminum phosphate etc. which aid its binding action. If for any reason it may be desirable, small quantities of the common organic binding materials may be incorporated although, ordinarily, their presence is not required.

It will be understood that the above example is by way of illustration only and that the details may be widely varied without departing from the spirit of my invention.

I claim:

1. A briquette of phosphate rock material, the particles of which are held together by acid calcium phosphate formed in situ and containing an excess $P_2O_5$ content over the original material.

2. A briquette of phosphate rock material, the particles of which are held together by acid calcium phosphate formed by the reaction of said material with phosphoric acid.

3. A briquette of phosphate rock material comprising acid calcium phosphate and aluminum phosphates as binders.

4. The method which consists in mixing phosphate rock material with phosphoric acid and briquetting the mixture before the reaction of said acid upon the material is completed.

5. The method which consists in mixing phosphate rock material with phosphoric acid, briquetting the mixture before the reaction of said acid upon the material is completed, and drying the briquettes so formed.

6. The method which consists in mixing finely divided rock material with phosphoric acid sufficient only to react with the surface of the grains and briquetting the mixture before the reaction of said acid upon the material is completed.

7. The method which consists in mixing phosphate rock material with crude phosphoric acid of phosphate rock-sulphuric acid manufacture, briquetting the mixture before the reaction of said acid upon the material is completed, and drying the briquettes so formed.

JAMES A. BARR.